US012643428B2

(12) United States Patent
Jang et al.

(10) Patent No.: US 12,643,428 B2
(45) Date of Patent: Jun. 2, 2026

(54) METHOD FOR PREDICTING CHARGING INFORMATION OF A BATTERY OF AN ELECTRIC VEHICLE

(71) Applicants: HYUNDAI MOTOR COMPANY, Seoul (KR); KIA CORPORATION, Seoul (KR)

(72) Inventors: Hyun Jun Jang, Daegu (KR); Byung Soo Park, Daejeon (KR); Woo Sung Kim, Suwon-si (KR); Jae Shin Yi, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 558 days.

(21) Appl. No.: 18/102,351

(22) Filed: Jan. 27, 2023

(65) Prior Publication Data

US 2024/0025291 A1      Jan. 25, 2024

(30) Foreign Application Priority Data

Jul. 25, 2022      (KR) ........................ 10-2022-0091501

(51) Int. Cl.
*B60L 58/12*                (2019.01)
(52) U.S. Cl.
CPC ........... *B60L 58/12* (2019.02); *B60L 2240/62* (2013.01)
(58) Field of Classification Search
CPC ...... B60L 58/12; B60L 2240/62; B60L 58/16; B60L 2240/64; B60L 2240/662; B60L 2250/18; B60L 2260/52; B60L 2260/54; G01C 21/343; G01C 21/3469; G01C 21/3679; B60Y 2200/91; Y02T 10/70; Y02T 10/7072; Y02T 90/12
See application file for complete search history.

(56) References Cited

U.S. PATENT DOCUMENTS

| | | | |
|---|---|---|---|
| 2013/0204456 A1* | 8/2013 | Tippelhofer | ............ B60L 53/00 701/1 |
| 2014/0354289 A1 | 12/2014 | Kim et al. | |
| 2019/0212392 A1* | 7/2019 | Ha | ............ H02J 7/80 |
| 2020/0269719 A1* | 8/2020 | Aykol | .............. B60L 53/30 |
| 2021/0146785 A1* | 5/2021 | Wang | .............. G06N 20/00 |
| 2023/0029389 A1* | 1/2023 | Bennett | .............. B60K 35/22 |
| 2023/0271521 A1* | 8/2023 | Jiang | .............. B60L 58/13 320/109 |

FOREIGN PATENT DOCUMENTS

KR                101449291  B1      10/2014

* cited by examiner

*Primary Examiner* — Thomas M Hammond, III
(74) *Attorney, Agent, or Firm* — Lempia Summerfield Katz LLC

(57) ABSTRACT

A system and a method for predicting charging information of a battery of an electric vehicle are disclosed. The method is for an electric vehicle driven by energy stored in the battery and includes steps configured to be executed by a controller provided in the electric vehicle. The method includes: collecting a target moving distance from a start location to a target location of the electric vehicle; estimating required energy required for the battery to move the target moving distance; and obtaining required charging information of the battery based on the estimated required energy.

14 Claims, 5 Drawing Sheets

Figure 2:
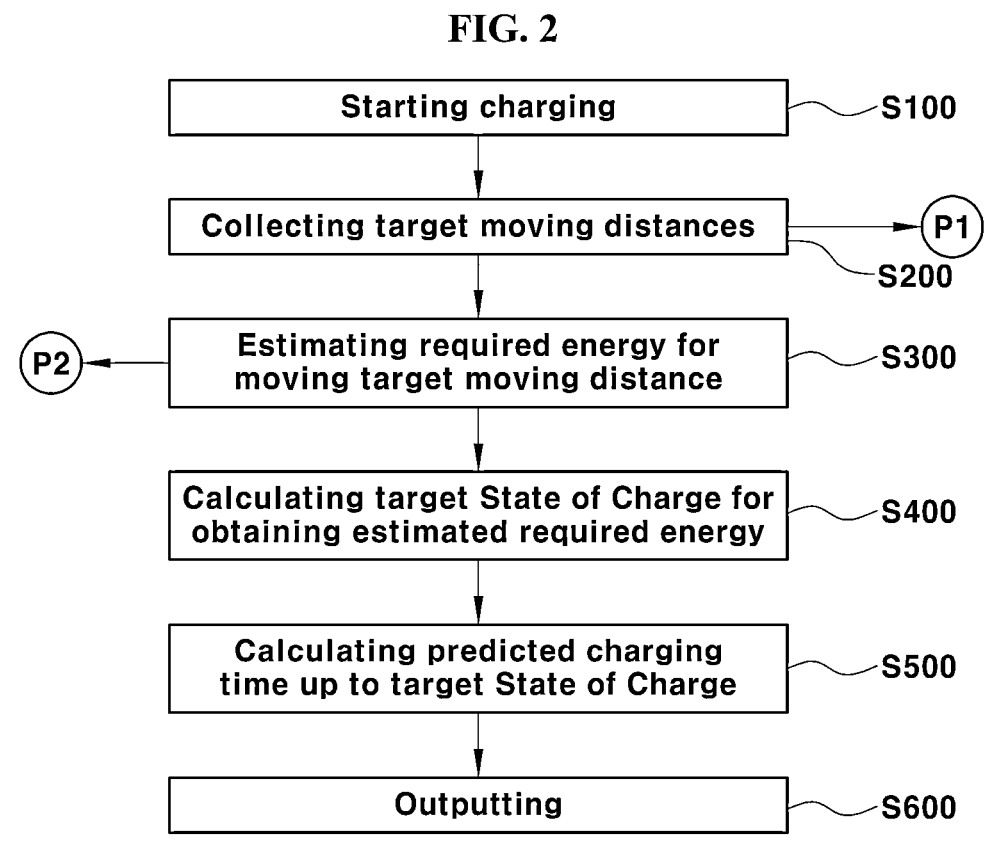

| Starting charging | —S100 |

↓

| Collecting target moving distances | → (P1) |
| | —S200 |

↓

(P2) ← | Estimating required energy for moving target moving distance | —S300 |

↓

| Calculating target State of Charge for obtaining estimated required energy | —S400 |

↓

| Calculating predicted charging time up to target State of Charge | —S500 |

↓

| Outputting | —S600 |

METHOD FOR PREDICTING CHARGING INFORMATION OF A BATTERY OF AN ELECTRIC VEHICLE

CROSS REFERENCE TO RELATED APPLICATION

The present application claims priority to Korean Patent Application No. 10-2022-0091501, Jul. 25, 2022, the entire contents of which are incorporated herein for all purposes by this reference.

BACKGROUND

Field of the Disclosure

The present disclosure relates to a system and a method for predicting charging information of a battery of an electric vehicle.

Description of the Related Art

A pure electric vehicle, a plug-in hybrid electric vehicle, and the like are vehicles that are driven partially or entirely by a motor and have recently received great attention in terms of environmental friendliness.

Such electric vehicles contain high-voltage batteries. The high-voltage battery stores energy for driving the motor and is configured to be rechargeable to provide the energy consumed by driving the vehicle.

Charging a battery of an electric vehicle may take place via a portable charger or at an electric vehicle (EV) charging station. When charging the battery, the user may check the amount of current charge, the remaining charging time, and the like, in a display unit of a vehicle, or in a mobile device configured to communicate with the vehicle.

The foregoing is intended merely to aid in understanding the background of the present disclosure. The foregoing is not intended to mean that the present disclosure falls within the purview of the related art that is already known to those having ordinary skill in the art.

SUMMARY

Accordingly, the present disclosure has been made keeping in mind the above problems occurring in the related art. The present disclosure is intended to provide a system and a method, with improved convenience, for predicting charging information of a battery.

Objectives of the present disclosure are not limited to the objectives mentioned above. Other objectives not mentioned may be clearly understood by those of ordinary skill in the art to which the present disclosure belongs from the description below.

In order to achieve the above objectives as described above and to perform characteristic functions of the present disclosure to be described later, features of the present disclosure may be as follows.

The present disclosure may be a method for predicting charging information of a battery of an electric vehicle driven by energy stored in the battery, wherein the following steps are configured to be executed by a controller provided in the electric vehicle. The method includes: collecting a target moving distance from a start location to a target location of the electric vehicle; estimating required energy required for the battery to move the target moving distance;

and obtaining required charging information of the battery based on estimated required energy.

According to the present disclosure, a predicted charging time of the battery is provided, calculated based on a driving distance to a target destination and by reflecting a driving habit of a driver and/or driving environment conditions. A system and a method for predicting charging information of a battery that can improve convenience when charging an electric vehicle are thereby provided.

Effects of the present disclosure are not limited to those described above. Other effects not mentioned should be clearly recognized by those having ordinary skill in the art from the following description.

BRIEF DESCRIPTION OF THE DRAWINGS

The above and other objectives, features, and other advantages of the present disclosure should be more clearly understood from the following detailed description when taken in conjunction with the accompanying drawings, in which:

FIG. 1 is a view showing a configuration of a system for predicting charging information of a battery according to the present disclosure;

FIG. 2 is a flowchart of a method for predicting charging information of a battery according to the present disclosure;

DETAILED DESCRIPTION

Figure 3:
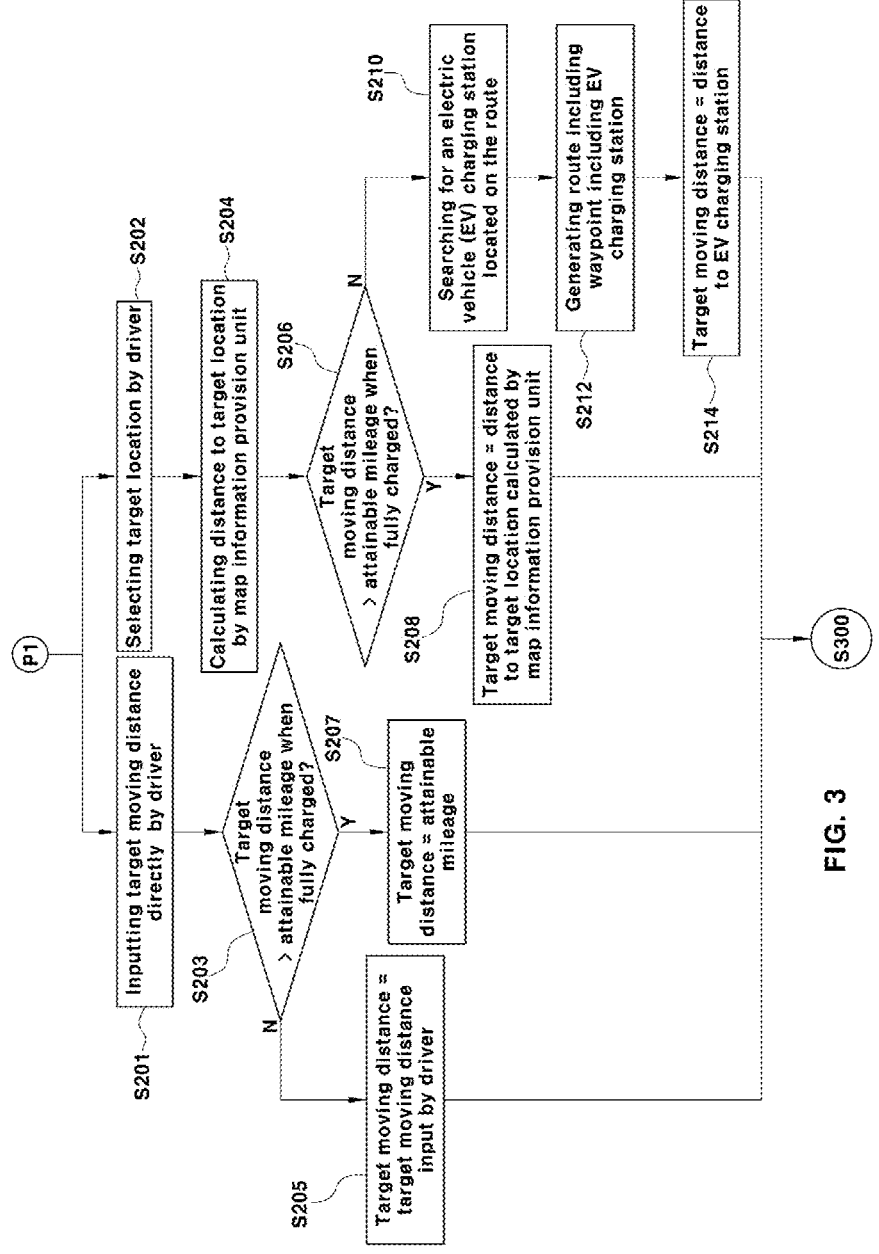
FIG. 3 is a detailed flowchart of P1 of FIG. 2.

Specific structural or functional descriptions presented in embodiments of the present disclosure are only exemplified for a purpose of describing embodiments according to a concept of the present disclosure. The embodiments according to the concept of the present disclosure may be implemented in various forms.

The descriptions should not be construed as being limited to the embodiments described herein and should be understood to include all modifications, equivalents, and substitutes included in the spirit and scope of the present disclosure.

In the present disclosure, terms such as "first" and/or "second" may be used to describe various components, but the components are not limited by the above terms.

The above terms are used only for the purpose of distinguishing one component from other components, i.e., for example, within the scope of the rights according to the concept of the present disclosure, the first component may be named as the second component, and similarly, the second component may also be referred to as the first component.

When a component is referred to as being "connected" or "coupled" to another component, it should be understood that it may be directly connected or coupled to another component, but other components may exist in between.

On the other hand, when an element is referred to as being "directly connected" or "directly coupled" to another element, it should be understood that no other element is present in between. Other expressions for describing the relationship between components, i.e., expressions, such as "between" and "immediately between" or "adjacent to" and "directly adjacent to," should be interpreted similarly.

Like reference numerals refer to like elements throughout the specification.

On the other hand, the terms used herein are for the purpose of describing embodiments and are not intended to limit the present disclosure. In the present specification, a singular form also includes a plural form unless specifically stated in a phrase. When a component, device, element, unit, or the like of the present disclosure is described as having a purpose or performing an operation, function, or the like, the component, device, element, or unit should be considered herein as being "configured to" meet that purpose or perform that operation or function.

As used herein, "comprises" and/or "comprising" refers to a referenced component, step, action, and/or a component and does not exclude the presence or addition of one or more other components, steps, operations, and/or devices. This applies equally to similar terms such as "include" and "have" and variations thereof. The present disclosure is described in detail with reference to the accompanying drawings.

A predicted charging time of a battery may be determined based on a charging current and target charging amount. Since the battery is highly temperature-dependent, the driving distance that a vehicle may drive is different even with the same State of Charge (SoC). Therefore, in order to move the same distance, a required charging amount is inevitably different at a temperature below 32 degrees Fahrenheit and at a temperature above 32 degrees Fahrenheit. Even in the same SoC, a distance that the vehicle may be driven may vary depending on the driving tendency of a vehicle driver.

The predicted charging time of the battery calculated without considering the temperature, driving habits of a driver, and the like, may be inaccurate. Accordingly, an objective of the present disclosure is to provide a method for predicting charging information that may more accurately provide a prediction time of battery charging for a required distance to the vehicle driver by reflecting such conditions.

Figure 1:
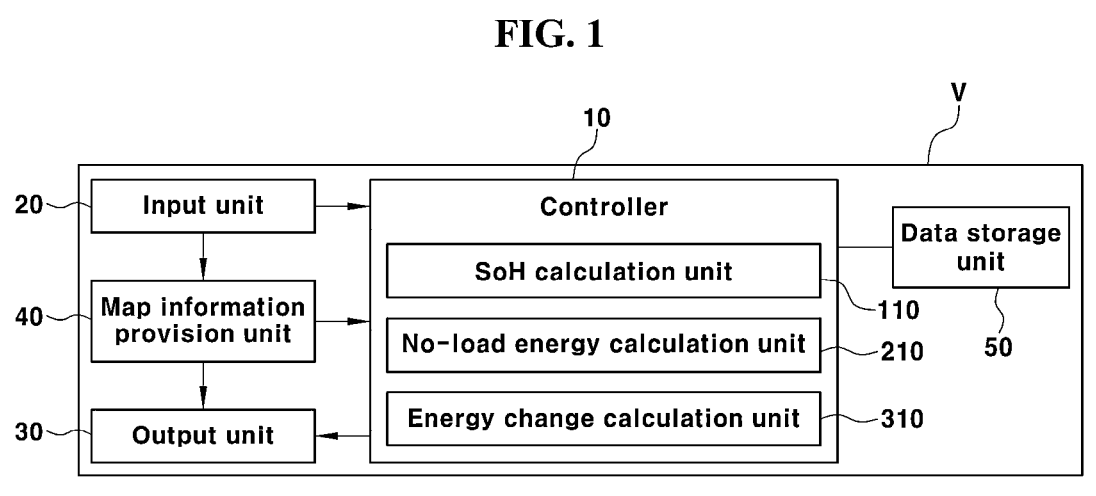

With reference to FIG. 1, the system for predicting charging information according to the present disclosure includes a controller 10. The controller 10 may be a battery management system (BMS) of an electric vehicle V or a separate controller provided for predicting charging information.

The controller 10 is communicatively connected to an input unit 20 and an output unit 30. In one embodiment, the input unit 20 and the output unit 30 may be a user interface provided in the vehicle V, such as a cluster of the vehicle V, and an Audio, Video, Navigation (AVN). The driver of the vehicle V may directly input a target driving distance, i.e., a target moving distance to a target location as the destination through the input unit 20, and the controller 10 is configured to receive same. The input unit 20 may include an electric charging port of the vehicle V. The controller 10 may also determine that charging is started when the charging gun is inserted into the electric charging port of the vehicle V.

The controller 10 is configured to communicate with a map information provision unit 40. In one embodiment, the map information provision unit 40 may be a navigation device mounted on the vehicle V. In one embodiment, the map information provision unit 40 may be a navigation device separate from the vehicle V but configured to communicate with the vehicle V. When the target location is input by the input unit 20, the map information provision unit 40 may generate a route to the target location and transfer the target moving distance to the target location to the controller 10 When there is a waypoint or a stop en route to the target location, the map information provision unit 40 may generate a route including the waypoint. The map information provision unit 40 may provide the controller 10 with a distance from the starting point to the waypoint, a distance from the waypoint to the target location, and a total distance from the starting position to the target location through the waypoint.

The controller 10 is configured to collect data from a data storage unit 50. In one embodiment, the data storage unit 50 may be included in the controller 10. In one embodiment, the data storage unit 50 is configured to be separate from the controller 10 but may be configured to be able to communicate with each other.

Various data may be stored in the data storage unit 50. In one embodiment, a driving record of a predetermined period may be stored in the data storage unit 50. For example, the predetermined period may be a period of months, years, or the like. The driving record for a period of time may be used to determine the driving habits of the driver. Based on the driving record for the predetermined period of time, the distance driven by the driver on average with respect to a unit change in the SoC in % (km/%) may be calculated. The energy E, e.g., in kilowatt-hour (kWh), consumed on average per the distance s when the unit change in the SoC in % is made may be calculated in kWh/km based on the driving record for the predetermined period. Alternatively, the energy E consumed for unit change in the state of charge (SoC in %) may be calculated in kWh/% based on the driving record for the predetermined period. Alternatively, the average use of current may be obtained based on the driving record of the predetermined period. An expected value of an average use of current in the future may be predicted according to the existing driving conditions through maps or formulas.

For example, by accumulating the currents of previous driving records, for example, a prior record collected from vehicle start (KEY ON) to vehicle stop (KEY OFF,) the average use of current per hour (Ampere-hour/hour) may be calculated. This calculation method is only an example, and the average use of current may be determined by other methods.

In one embodiment, the data storage unit 50 may store seasonal outdoor temperature information. For example, the outdoor temperature information may be an average temperature at a predetermined point in a year. Since temperature greatly affects the performance of the battery, the present disclosure is configured to determine a target SoC in consideration of the outdoor temperature information stored in the data storage unit 50.

The controller 10 is configured to perform a computation for obtaining a target moving distance. The controller 10 is configured to calculate the required energy necessary to move to a target location based on environmental conditions including a battery state and temperature driving characteristics of a driver, and the like.

The controller 10 includes a state of health (SoH) calculation unit 110 configured to calculate the SoH of the battery. The SoH of the battery is the ratio of a current maximum capacity to a rated capacity of the battery enabling the aging of the battery to be estimated. Alternatively, the SoH of the battery may be determined by comparing an initial SoH measured with respect to an initial battery state with the current SoH based on the factors that change according to the use of the battery. As a non-limiting example, the factors may include internal resistance, voltage, charging performance, and the like of the battery. For example, the SoH may be calculated through a value obtained by dividing an integrated current value by an amount of a change in the SoC. The amount of a change in the SoC may be estimated through mapping of the SoC-open circuit voltage (OCV).

Calculation of the SoH is not performed only in the above-described manner and may be calculated through other methods.

The controller 10 includes a no-load energy calculation unit 210 configured to calculate the no-load energy of the battery. For example, the no-load energy of the battery may be obtained through a map or a lookup table provided for each SoC and temperature of the battery.

The controller 10 includes an energy change calculation unit 310 configured to calculate an energy change according to a preset factor that is a usage condition. The preset factors may include the SoC, temperature, average current, and expected temperature change, of the battery. The energy change for each factor may be stored in the data storage unit 50 in a form of a map, a lookup table, or the like. The controller 10 may retrieve necessary data from the data storage unit 50. In some embodiments, the energy change for each factor may be determined by an equation. As a non-limiting example, the expected temperature change may be determined based on the amount of change in the SoC, the temperature of the battery, the outside temperature, and the like. The predicted value determined using an experiment or a temperature model may be used.

In some embodiments, SoC, temperature, average usage current, SoH, no-load energy, terminal voltage, and the like, of the battery, are stored in the battery management system (BMS) of the vehicle V or may always be measured or calculated. The controller 10 may also acquire necessary battery information from the battery management system (BMS).

A method for predicting charging information of a battery according to the present disclosure is described with reference to FIG. 2.

Predicting charging information of a battery according to the present disclosure starts with requesting charging or starting charging in step S100. The charging request may be determined by the input of the driver through the input unit 20. For example, the charging may be determined to start in accordance with the charging gun being inserted into the electric charging port of the vehicle V.

The controller 10 is configured to collect target moving distances in order to calculate the predicted charging time required to reach an SoC required to move a target moving distance in S200.

As shown in FIG. 3, in some embodiments, the target moving distance may be directly input by the driver through the input unit 20. In some embodiments, the target moving distance may be determined by the driver inputting the target location through the input unit 20. When the driver inputs the target location, the map information provision unit 40 may generate a route to the target location and transfer a required target moving distance to the target location to the controller 10.

At step S201, the target moving distance is directly input by the driver through the input unit 20. The controller 10 determines whether the input target moving distance is greater than the attainable mileage or distance when the vehicle V is fully charged in S203. When it is determined that the input target moving distance is no greater than the attainable distance when the vehicle V is fully charged, the controller 10 sets a target moving distance input by the driver as a target moving distance in S205. When it is determined that the input target moving distance exceeds the attainable distance when the vehicle V is fully charged, the controller 10 sets the attainable distance when the vehicle V is fully charged as the target moving distance in S207. In some embodiments, the controller 10 may notify through the output unit 30 that charging is required at least one more time to move the target moving distance. When the target distance input by the driver is greater than the attainable distance when fully charged, the controller 10 carries out a computation hereafter to provide a predicted charging time required to charge the state of charge (SoC) until fully charged. The controller 10 sets the attainable distance on a full charge as the target moving distance. The attainable distance on a full charge means a maximum distance possible for the vehicle V to travel when the vehicle V is fully charged. The controller 10 may notify the driver through the output unit 30 of the fact that the moving distance to the target location is greater than the attainable distance on a full charge and that the charging time required until full charging is predicted and provided, accordingly.

When the driver inputs the target location instead of the target moving distance through the input unit 20, the process proceeds to step S202. When the target location is input by the input unit 20, the controller 10 causes the map information provision unit 40 to calculate the distance to the target location at S204. According to the present disclosure, in preparation for a case where the distance to the target location is greater than the distance that the vehicle V may be driven when fully charged, the controller 10 may determine whether the distance to the target location is greater than the distance that the vehicle V may be driven when fully charged. The controller 10 compares the distance to the target location calculated by the map information provision unit 40 and the distance to be able to drive when the vehicle V is fully charged at S206. When the distance to the target location calculated by the map information provision unit 40 is equal to or less than the distance to be able to drive when fully charged, the controller 10 sets the distance to the target location calculated by the map information provision unit 40 as the target moving distance at S208.

When the distance to the target location calculated by the map information provision unit 40 is greater than the distance to be able to drive when fully charged, the controller 10 causes the map information provision unit 40 to search for an electric vehicle charging station located on the route to the target location at S210. The controller 10 is configured to select the most suitable station, for example, an electric vehicle charging station located closest to the route and located at a certain distance from the starting position. The controller 10 instructs the map information provision unit 40 to generate a route that includes the waypoint including the selected charging station to the target location at S212. The map information provision unit 40 is configured to set the target moving distance for determining a predicted charging time as the distance to the selected electric vehicle charging station and transfer a set distance to the controller 10 at S214.

With reference again to FIG. 2, when the target moving distance is obtained as such, the controller 10 calculates the required energy for moving the target moving distance at S300 and calculates the target state of charge (SoC) that may satisfy the required energy in S400. The controller 10 calculates the predicted charging time required to obtain the calculated target state of charge (SoC) at S500 and provides the calculated predicted charging time to the driver through the output unit 30 at S600.

Figure 4:
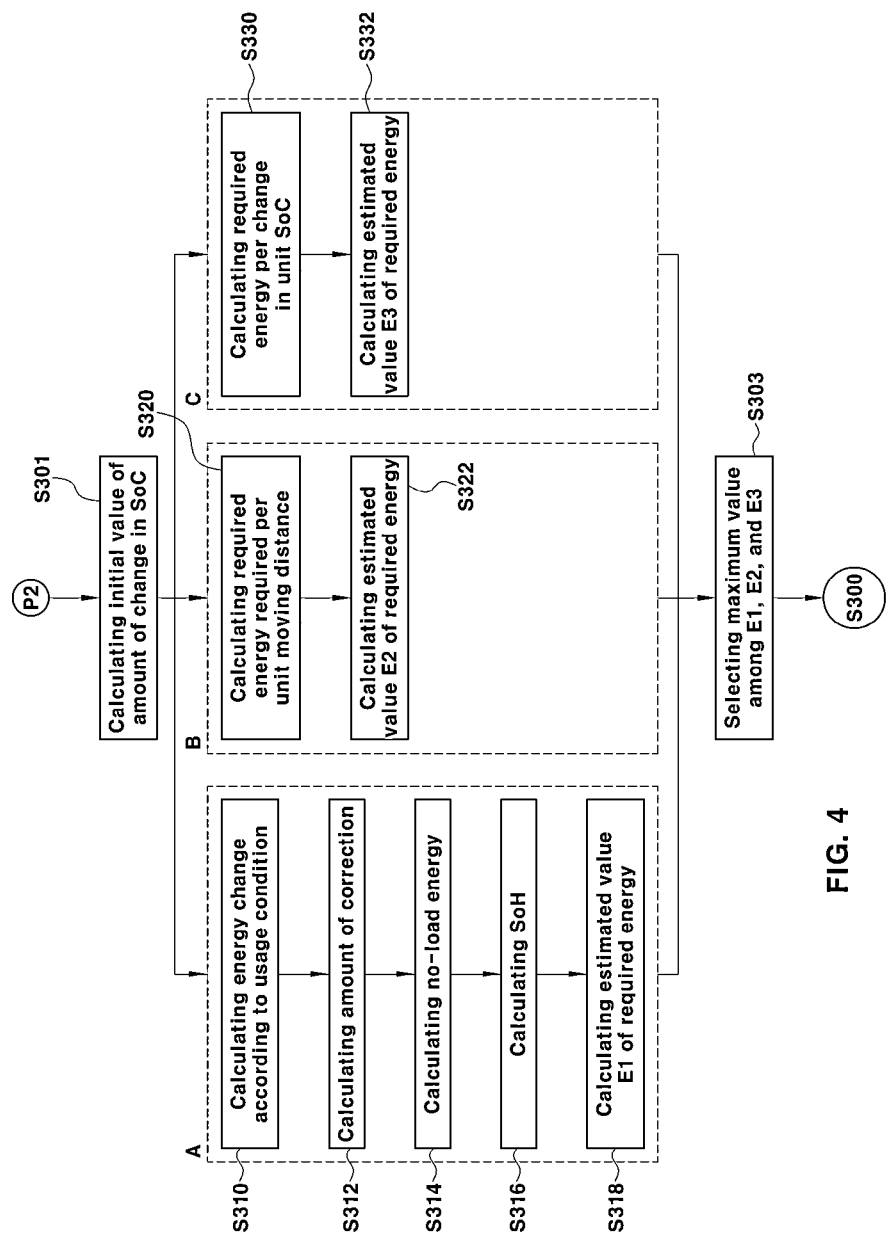
FIG. 4 is a detailed flowchart of P2 of FIG. 2.

With reference again to FIG. 4, according to some embodiments of the present disclosure, the required energy for moving the target moving distance of step S300 may be calculated as shown in FIG. 4.

The controller 10 calculates an initial value of the required amount of a change in the SoC based on the set target moving distance at S301. The initial value of SoC change is determined based on the driving record of the driver. For example, assume that the driving distance per unit change in the SoC of the battery derived from the driving record of the driver and stored in the data storage unit 50 is 4 km, and the target moving distance is 300 km. Then the initial value of the required amount of a change in the SoC is 75%. For example, when the current state of charge (SoC) of the battery is 25%, the target state of charge (SoC) is 50% based on the initial value of SoC change of 75%.

According to some embodiments of the present disclosure, as indicated by the dotted line box A, the controller 10 is configured to estimate the required energy based on a calculation result performed for calculating the required energy by the SoH calculation unit 110, the no-load energy calculation unit 210, and the energy change calculation unit 310.

The controller 10 is configured to calculate an expected energy change according to a usage condition calculated from the energy change calculation unit 310 in S310. As described above, the expected energy change value according to the usage condition may be determined by a formula based on average use of current of the battery, the SoC, a temperature of the battery, an outside temperature, available energy of the battery, and the like. The formula may be stored in the data storage unit 50, and calculation may be performed by the controller 10.

The controller 10 subtracts the estimated terminal voltage and the currently measured terminal voltage, of the battery. Moreover, the controller 10 is configured to calculate an amount of correction proportional to the subtracted value in consideration of the temperature and the SoC at S312. The amount of correction may be obtained by multiplying a difference between the estimated terminal voltage and the currently measured terminal voltage by the battery capacity or available energy. In addition to the estimated terminal voltage, the electromotive force of the battery, internal resistance, polarization voltage, and the like, may be considered.

The no-load energy calculation unit 210 of the controller 10 is configured to calculate the no-load energy of the battery at S314. No-load energy may be determined by the battery management system (BMS) based on the temperature, the SoC, and the like.

The SoH calculation unit 110 of the controller 10 is configured to calculate the SoH during normal charging at S316.

The controller 10 is configured to calculate a required energy estimation value E1 at S318 based on the values calculated in steps S310 to S316. The controller 10 subtracts an expected energy change value according to the usage condition from the no-load energy calculated by the no-load energy calculation unit 210. The calculated amount of correction is added to the subtracted energy change value. The required energy estimation value E1 may be calculated by multiplying the SoH during normal charging calculated by the SoH calculation unit 110.

According to some embodiments of the present disclosure, the required energy may also be estimated based on a driving habit of a driver. According to some embodiments of the present disclosure, as indicated by a dotted line box B, the required energy may be calculated through the energy required per unit moving distance s stored in the data storage unit 50 in S320. For example, in light of a driving habit record of a driver stored in the data storage unit 50, assume that the driver consumes 0.2 kWh of energy E per one kilometer that is a unit moving distance s. Then an energy equivalent to 60 kWh is required when the target moving distance is 300 km. The energy calculated as described above may be estimated at S322 as a required energy estimation value E2.

According to some embodiments of the present disclosure, the required energy may be calculated at S330 based on the energy required for a unit change in the state of charge (SoC) calculated based on the driving record of the driver stored in the data storage unit 50. For example, in light of the record in the data storage unit 50, assume that the driver consumes 4 kWh of energy on average when the state of charge (SoC) is subjected to the unit change. Then it is determined that the state of charge (SoC) of 75% is required for the target moving distance of 300 km. Energy corresponding to the required amount of change in the SoC (ΔSoC) of 75% may be estimated at S332 as a required energy estimation value E3.

Figure 5:
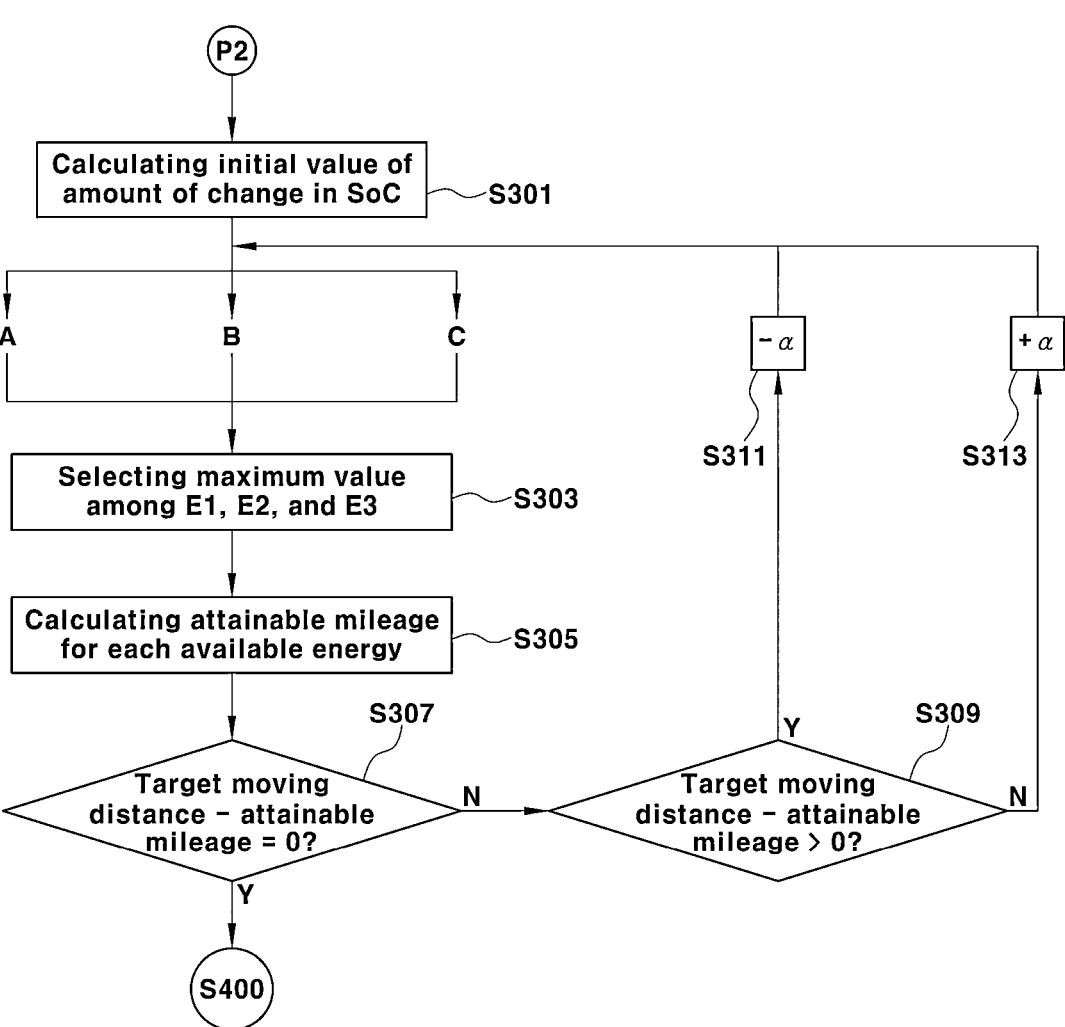
FIG. 5 is a detailed flowchart of P2 of FIG. 2 in accordance with some embodiments of the present disclosure.

When estimating the required energy estimation values E1, E2, and E3, the initial value calculated at step S301 is used as the required amount of change in the SoC (ΔSoC). The initial value of the SoC may act as a temporary value for determining the target SoC. A required energy is estimated based on at least in part the initial value of the SoC. As explained below with reference to FIG. 5, the target state of charge reflecting the current actual state of charge of the battery may be obtained by being iteratively calculated by being compared with the actual state of charge of the battery.

According to some embodiments of the present disclosure, the maximum value among the required energy estimation values E1, E2, E3 may be selected by the controller 10 at S303. The required energy is selected as the maximum value in order to minimize the error in the predicted charging time that is provided as more energy than the estimated energy is consumed.

With reference again to FIG. 2, the controller 10 is configured to calculate the required state of charge required for the estimated required energy. The required state of charge may be provided as SoC (unit: %) at S400.

When the target SoC is calculated, the controller 10 calculates a predicted charging time for reaching the target SoC at S500.

The controller 10 may display the calculated predicted charging time on the output unit 30 and provide same to the driver in S600.

With reference again to FIG. 5, according to the present disclosure, in order to calculate the target state of charge of the battery, an initial value of SoC change is corrected through iterations. For example, the expected temperature change may be determined based on the calculated initial value of SoC change. Alternatively, for example, the initial value of SoC change is used as the required amount of change in the SoC when calculating the energy (box C in FIG. 4) required for a unit change in the state of charge calculated based on the driving record of the driver.

The controller 10 derives an attainable distance for the vehicle V to be able to drive with the currently available energy of the battery at S305. In some embodiments, the attainable distance with respect to available energy may be obtained through a map, a lookup table, or the like.

The controller 10 compares the target moving distance calculated at step S200 with the attainable distance with the calculated current available energy, at S307 and S309. The controller 10 is configured to calculate the amount of a change in the SoC (i.e., the target SoC) required to move the target moving distance based on the current SoC of the battery.

When there is no difference between the target moving distance and the calculated distance to be able to drive, the process proceeds to step S400. For example, in the above example, assume that the required driving distance is 100 km, and the distance to be able to drive is also 100 km. Then the target state of charge for the estimated energy selected at step S303 is calculated at step S400. It may be determined that the target state of charge corresponding to the estimated required energy determined based on the initial value of a change in the SoC is required to move the target moving distance.

When there is a difference between the target moving distance and the calculated distance to be able to drive, it is determined whether the difference value is positive or negative at S309. When the difference between the target moving distance and the calculated distance to be able to drive is greater than 0, $-\alpha\%$ is subtracted from the initial value of SoC change, and the process proceeds to S311 next to step S301. A required actual state of charge may be calculated in consideration of the currently available energy of the vehicle V, i.e., the current distance to be able to drive.

When the difference between the target moving distance and the calculated distance to be able to drive is 0 or less, the controller 10 is configured to add $\alpha\%$ to the initial value of SoC change value and move after step S301 to perform the following steps at S313. As a non-limiting example, $\alpha\%$ may be 1%.

Calculations continue until the target moving distance and the calculated distance to be able to drive are the same. When the target moving distance and the calculated distance to be able to drive become the same, the required energy estimation value at that time is converted into the target state of charge (SoC) at S400. The predicted charging time for the target SoC is obtained and provided to the driver at S500 and S600.

As described above, the present disclosure may provide the predicted charging time required in accordance with an input of the target moving distance, thereby promoting convenience of the electric vehicle driver. The controller and various units described herein may include one or more processors or may utilize the same processor, may include a storage or memory, i.e. a transitory and/or non-transitory memory and may be configured to perform the above described method steps, calculations, estimations, and the like.

The present disclosure may provide a predicted charging time in consideration of the driving habits by each individual driver, thereby providing more accurate and reliable results.

The concepts of the present disclosure described above is not limited by the above-described embodiments and the accompanying drawings. It should be clear to those who have ordinary skill in the technical field to which the present disclosure pertains that various substitutions, modifications, and changes are possible within the scope without departing from the technical spirit of the present disclosure.

What is claimed is:

1. A method for predicting charging information of a battery of an electric vehicle driven by energy stored in the battery, the method comprising:

determining, by a controller configured to communicate with a user interface, a target moving distance from a start location to a target location of the electric vehicle, wherein the target moving distance is input by a driver through the user interface in the electric vehicle;

determining, by the controller, required energy required for the battery to drive the target moving distance, wherein determining the required energy comprises determining, by the controller, an initial value of SoC change, the initial value of SoC change being the SoC required for moving the target moving distance;

determining, by the controller, required charging information of the battery based on the required energy;

determining an attainable distance for the electric vehicle at a currently available energy of the battery;

comparing the target moving distance with the attainable distance;

determining the required energy by correcting the initial value of SoC change based on the comparison;

based on the target moving distance and the attainable distance being the same, determining a target SoC charge by converting the required energy into a SoC;

determining a predicted charging time required for charging of the target SoC; and displaying, by the user interface, the required charging information and the predicted charging time, wherein the required energy is determined by combining one or more energy change estimation values selected from a group consisting of:

(a) a first energy change estimation value determined based on one or more of a state of charge (SoC), temperature, average use of current, ambient temperature information, and expected temperature change, of the battery;

(b) a second energy change estimation value determined based on an average required energy per unit moving distance of the electric vehicle, which is determined based on a past driving record of the electric vehicle for a predetermined period, and (c) a third energy change estimation value determined based on the average required energy per unit SoC of the electric vehicle, which is determined based on the past driving record of the electric vehicle for the predetermined period, wherein the combining comprises selecting the largest value among the selected energy change estimation values.

2. The method of claim 1, wherein an amount of correction based on a difference between an estimated terminal voltage and a measured terminal voltage, of the battery, is applied to the energy change estimation value.

3. The method of claim 1, wherein the energy change estimation value is further determined based on at least one of no-load energy and a state of health (SoH) of the battery.

4. The method of claim 1, wherein determining the required charging information comprises:

determining, by the controller, a target SoC for the required energy; and determining, by the controller, a predicted charging time for the target SoC.

5. The method of claim 1, wherein determining the required energy comprises:

determining, by the controller, a moving distance per unit SoC determined based on the past driving record stored in a data storage unit of the electric vehicle for the predetermined period, and wherein the initial value of SoC change is determined based on the moving distance per unit SoC; and determining, by the controller, a required energy estimation value based on the initial value of SoC change, a state of the battery, and a temperature condition.

6. The method of claim 5, wherein the state of the battery comprises:

the SoC, the SoH, temperature, average use of a current, and available energy of the battery, wherein the temperature condition is information about ambient temperature.

7. The method of claim 5, further comprising:

performing, by the controller, a subtraction of a predetermined value from the initial value of the SoC change based on the target moving distance being greater than an attainable distance; and determining, by the controller, the required energy estimation value based on the subtraction.

8. The method of claim 5, further comprising:

performing, by the controller, an addition of a predetermined value to the initial value of SoC change based on the target moving distance being smaller than an attainable distance; and determining, by the controller, the required energy estimation value based on the addition.

9. The method of claim 1, wherein the collecting of the target moving distance comprises collecting the target moving distance input by an input unit configured to communicate with the controller.

10. The method of claim 1, further comprising:

performing, by the controller, a comparison of the target moving distance input by the driver with a maximum moving distance by a fully charged battery; and determining, by the controller, a revised target moving distance based on the comparison.

11. The method of claim 10, wherein determining the target moving distance comprises:

setting, by the controller, the target moving distance input by the driver as the revised target moving distance based on the distance of the moving route being the maximum moving distance or less.

12. The method of claim 10, wherein determining the target moving distance comprises:

based on the distance of the driving route being greater than the maximum moving distance, setting, by the controller, the maximum moving distance as the revised target moving distance.

13. The method of claim 1, further comprising:

generating, by a map information provision unit communicatively connected to the controller, a route from the start location to the target location based on the required charging information, wherein the route includes a waypoint to a charging station located closest to the route.

14. A system of predicting charging information of an electric vehicle, the system comprising:

a display;

a processor configured to communicate with the display; and a memory coupled to the processor and storing instructions, wherein the memory, when executed by the processor, causes the processor to:

determine a target moving distance from a start location to a target location of the electric vehicle;

determine required energy required for the battery to drive the target moving distance by determining an initial value of SoC change, the initial value of SoC change being the SoC required for moving the target moving distance;

determine required charging information of the battery based on the required energy;

determine an attainable distance for the electric vehicle at a currently available energy of the battery;

compare the target moving distance with the attainable distance;

determine the required energy estimation value by correcting the initial value of SoC change based on the comparison;

based on the target moving distance and the attainable distance being the same, determine a target SoC charge by converting the required energy estimation value into a SoC;

determine a predicted charging time required for charging of the target SoC; and present the required charging information and the predicted charging time on the display, wherein the required energy is determined by combining one or more energy change estimation values selected from a group consisting of:

(a) a first energy change estimation value determined based on one or more of a state of charge (SoC), temperature, average use of current, ambient temperature information, and expected temperature change, of the battery, (b) a second energy change estimation value determined based on an average required energy per unit moving distance of the electric vehicle, the average required energy per unit moving distance being determined based on a past driving record of the electric vehicle for a predetermined period, and (c) a third energy change estimation value determined based on an average required energy per unit SoC of the electric vehicle, the average required energy per unit SoC being determined based on the past driving record of the electric vehicle for the predetermined period, wherein the combining comprises selecting the largest value among the selected energy change estimation values.

* * * * *